United States Patent
Zhang et al.

(10) Patent No.: US 8,388,712 B2
(45) Date of Patent: Mar. 5, 2013

(54) PARTICULATE MATTER RETAINING AND PURGING SYSTEM

(75) Inventors: Xiaogang Zhang, Novi, MI (US); Paul Joseph Tennison, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1058 days.

(21) Appl. No.: 12/370,189

(22) Filed: Feb. 12, 2009

(65) Prior Publication Data

US 2010/0199839 A1    Aug. 12, 2010

(51) Int. Cl.
| | |
|---|---|
| B01D 41/00 | (2006.01) |
| B01D 45/18 | (2006.01) |
| B01D 46/04 | (2006.01) |
| F01N 3/00 | (2006.01) |
| F01N 5/04 | (2006.01) |
| F01N 5/00 | (2006.01) |
| F02M 25/06 | (2006.01) |

(52) U.S. Cl. ............. 55/302; 55/282.3; 60/295; 60/274; 60/275; 60/276; 60/277; 60/278; 60/279; 60/280; 60/281; 60/282; 60/283; 60/284; 60/285; 60/286; 60/287

(58) Field of Classification Search .................... 55/303, 55/282.3; 60/295, 274–287
See application file for complete search history.

(56) References Cited

U.S. PATENT DOCUMENTS

| | | | | |
|---|---|---|---|---|
| 3,207,493 | A * | 9/1965 | Swain | 432/180 |
| 3,870,474 | A * | 3/1975 | Houston | 422/171 |
| 4,923,484 | A * | 5/1990 | Saito | 95/20 |
| 5,085,049 | A * | 2/1992 | Rim et al. | 60/274 |
| 5,595,581 | A | 1/1997 | Ichikawa et al. | |
| 5,701,735 | A | 12/1997 | Kawaguchi | |
| 5,768,888 | A * | 6/1998 | Matros et al. | 60/274 |
| 5,974,791 | A * | 11/1999 | Hirota et al. | 60/276 |
| 5,997,292 | A * | 12/1999 | Tanaka et al. | 432/181 |
| 6,082,100 | A * | 7/2000 | Boegner et al. | 60/278 |
| 6,170,259 | B1 * | 1/2001 | Boegner et al. | 60/286 |
| 6,233,926 | B1 * | 5/2001 | Bailey et al. | 60/295 |
| 6,375,695 | B2 | 4/2002 | Machida et al. | |
| 6,409,973 | B1 * | 6/2002 | Kinugasa et al. | 422/171 |
| 6,655,133 | B2 * | 12/2003 | Mikami et al. | 60/296 |
| 6,673,325 | B2 * | 1/2004 | Gravel | 423/210 |
| 6,679,051 | B1 | 1/2004 | Van Nieustadt et al. | |
| 6,877,312 | B2 * | 4/2005 | Nakatani et al. | 60/288 |
| 7,398,645 | B2 * | 7/2008 | Zheng et al. | 60/288 |

(Continued)

FOREIGN PATENT DOCUMENTS

WO    2006/117993    11/2006

*Primary Examiner* — Amber Orlando
(74) *Attorney, Agent, or Firm* — Julia Voutyras; Alleman Hall McCoy Russell & Tuttle LLP

(57) ABSTRACT

Systems and methods are provided for operating a particulate matter retaining system having at least a first and a second filter, coupled to an engine intake. One example method comprises, during a first condition, operating in a first mode with the first filter storing particulate matter and the second filter releasing stored particulate matter. The method further comprises, operating in a second mode with the first filter releasing stored particulate matter and the second filter storing particulate matter, the exhaust gas flowing in an opposite direction as compared to the first mode. The method further comprises, operating in a third mode with both the first and the second filter storing particulate matter. During the modes, at least some tailpipe gas is drawn from between the first and second filters for expulsion to the atmosphere.

25 Claims, 8 Drawing Sheets

U.S. PATENT DOCUMENTS

| | | |
|---|---|---|
| 7,763,174 B2 * | 7/2010 | Bos et al. ...................... 210/660 |
| 2003/0066287 A1 * | 4/2003 | Hirota et al. .................... 60/297 |
| 2004/0035101 A1 * | 2/2004 | Imai et al. ...................... 60/295 |
| 2006/0130470 A1 * | 6/2006 | Dorn et al. ...................... 60/309 |
| 2007/0294999 A1 | 12/2007 | Yoshizaki et al. |
| 2009/0308060 A1 * | 12/2009 | Suzuki et al. .................. 60/311 |

\* cited by examiner

FIG. 3 (Mode 1)

FIG. 4 (Mode 2)

FIG. 5 (Mode 3)

PARTICULATE MATTER RETAINING AND PURGING SYSTEM

FIELD

The present description relates generally to an exhaust treatment system for a combustion engine, and particularly to diesel particulate matter purifying systems for diesel engines.

BACKGROUND/SUMMARY

Exhaust gas discharged from a diesel engine contains, as a main component, a large amount of fine particles. The fine particles, also referred to as diesel particulate matter (DPM), include diesel soot (that is, carbon particles) and aerosols such as ash particulates, metallic abrasion particles, sulfates, and silicates. When released into the atmosphere, DPM can pose serious environmental and health risks.

Accordingly, diesel particulate filters (DPFs) have been devised for collecting the particulate matter. The DPFs require regular regeneration wherein the collected particulates are removed (for example, by burning) to maintain the collection capacity of the filter and reduce pressure loss due to clogging. One example approach for filter regeneration is shown by Ichikawa et al. in U.S. Pat. No. 5,595,581. Herein, a pair of filters are used to remove fine particles from exhaust gas during a collection operation. During a filter regeneration operation, blow-by gas is intermittently blown through one of the filters to purge the collected fine particles. The fine particles are pneumatically conveyed to a collector tank wherefrom they are disposed of by burning.

However, the inventors herein have recognized several potential issues with such an approach. As one example, there may not be sufficient blow-by gas to purge one of the filters before the other filter reaches its maximum collection capacity. As another example, the back pressure from the exhaust gas may reduce the purging efficacy of the blow-by gas during the regeneration operation. Either situation may lead to incomplete filter regeneration and degraded collection performance on subsequent collection operations. As yet another example, the approach shown by Ichikawa requires accessory components such as a collector tank and an associated electric heater or burner. Thus, regular maintenance of the accessory components may be necessitated to maintain the performance of the filter apparatus.

Thus, in one example, some of the above issues may be addressed by a method of operating a particulate matter retaining system coupled to an engine exhaust and an engine intake, the particulate matter retaining system comprising at least a first and a second filter, the method comprising, operating in a first mode with the first filter storing particulate matter and the second filter releasing stored particulate matter, with exhaust gas flowing in a first direction through the filters, where flowing in the first direction comprises flowing through the first filter before flowing through the second filter, and where during the first mode, at least some tailpipe gas is drawn from between the first and second filter for expulsion to the atmosphere. The method may further comprise operating in a second mode with the first filter releasing stored particulate matter and the second filter storing particulate matter, with the exhaust gas flowing in a second, opposite, direction through the filters, where flowing in the second direction comprises flowing through the second filter before flowing through the first filter, and where during the second mode, at least some tailpipe gas is drawn from between the first and second filter for expulsion to the atmosphere. In this way, in a given mode, it is possible to coordinate particulate matter storing and release, while flowing exhaust gas through the particulate matter retaining system in a single direction. As such, this concerted action may prevent heavy soot build-up and related pressure issues in the filters. Further, in this way, the direction of exhaust gas flow through the system may be effectively reversed, thereby reversing the particulate matter storing and releasing functions of the filters. By drawing at least some tailpipe exhaust gas from between the filters, specifically after the particulate matter storing filter and before the particulate matter releasing filter, the particulate matter content of exhaust that is expelled to the atmosphere may be substantially reduced. In this way, the quality of emissions from an engine with a particulate matter retaining system may be improved without requiring complicated system maintenance and regeneration.

In one example, during the first mode, gas exiting the second filter may be routed to the engine intake. Similarly, during the second mode, gas exiting the first filter may be routed to the engine intake. The direction and rate of exhaust flow through each of the filters may be adjusted through control valves coupled to the respective filters. In this way, particulates collected in a diesel particulate filter may be routed to an engine intake, thereby reducing the need for filter regeneration, and regeneration related accessory components (such as a collector tank and soot burner, although such regeneration may still be used in some examples, if desired). By using the exhaust gas flow to direct stored particulates into an engine intake, degraded filter purging related to insufficient blow-by gas may also be averted. Furthermore, by reducing the need for actively regenerating the filters using escalated exhaust temperatures, such as may be induced by downpipe fuel injections, the fuel economy of the engine may be improved.

In either operating mode, that is, during the first and second modes, at least some tailpipe gas may be drawn from between the filters for optional further processing in downstream catalytic converters (such as NOx reducing SCR catalysts) and/or for expulsion to the atmosphere. The remaining portion of the gases (including the released particulates) may be routed to the engine intake, specifically to the engine cylinders, for subsequent combustion, through an EGR line. A regulatory valve and/or an EGR valve may determine the amount of tailpipe gas drawn from between the filters and the amount of exhaust recycled to the intake manifold via the EGR line based on engine operating conditions. These conditions may include, for example, a desired EGR rate, the air-fuel ratio, engine speed/load, the exhaust temperature, etc. The PM retaining system may be sequentially operated between the first and second operating modes. In one example, a controller may operate the filters in the first mode for a predetermined time interval, following which the operating mode may be alternated. Similarly, after operating the filters in the second mode for the predetermined time interval, the operating mode may be switched back to the first mode. As one example, each operating mode may only last one hour such that each filter may only have a half maximal soot load at the end of each operation. In other examples, each operating mode may last a different time interval based on different engine operating conditions, where the interval is determined by factors such as a DPF soot load (for example, based on the DPF backpressure), engine soot model, the output from an integrating soot sensor (for example, a sensor that accurately measures the actual PM load in the filters), filter temperature, etc.

While the example suggests operating the PM retaining system sequentially between the first and second operating modes based on a time interval, in other embodiments, operation between the modes may be alternated responsive to a DPF backpressure (for example, a threshold pressure), an engine soot model, the output of an integrating soot sensor capable of accurately measuring the actual PM load in the filters (for example, a threshold PM load), etc.

Further still, the PM retaining system may be operated in a third mode in response to specific engine operating conditions, such as during a peak power and/or high load output. During the third mode, both filters may be storing particulate matter. Herein, the valves may be adjusted such that the exhaust may be directed through both filters before being vented to the atmosphere.

In this way, by alternating operating modes at frequent intervals such that high soot loads are avoided in the filters, clogging of the filters and related pressure drop issues may be reduced. By releasing the collected particulates into the engine intake, regeneration-related components such as collector tanks (for collecting the particulates) and electric burners (for burning the particulates) may be avoided. Furthermore, by reducing the need for active regeneration of the DPFs, wherein an additional amount of fuel is used to increase the temperature of the DPF and burn off the stored soot, over-temperature related component degradation may be reduced while also improving the fuel economy of the vehicle. Further still, by recovering some energy from burning the particulates in the engine intake, engine fuel efficiency may be significantly improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
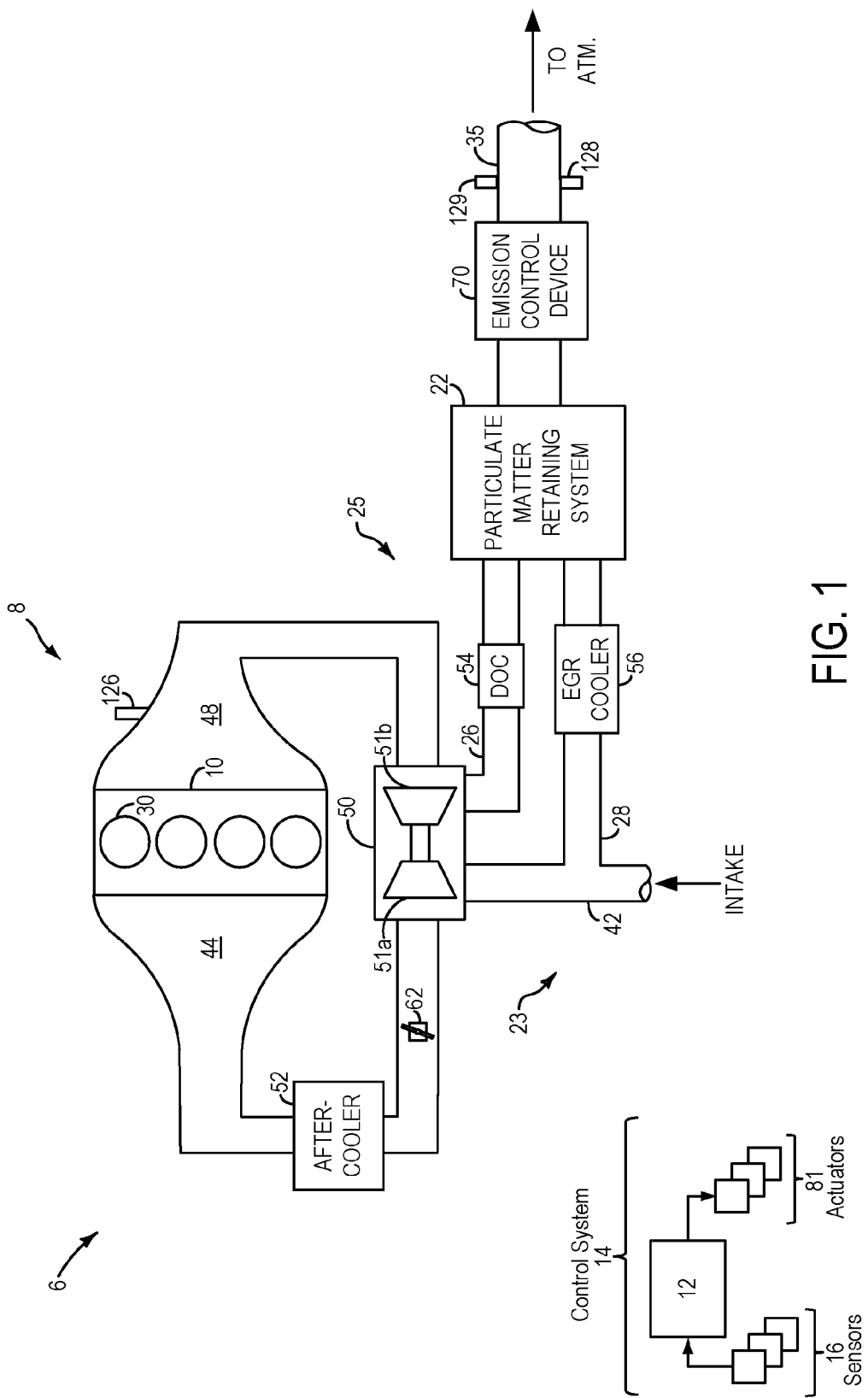
FIG. 1 shows a schematic depiction of an engine and an associated particulate matter retaining system.
Figure 3:
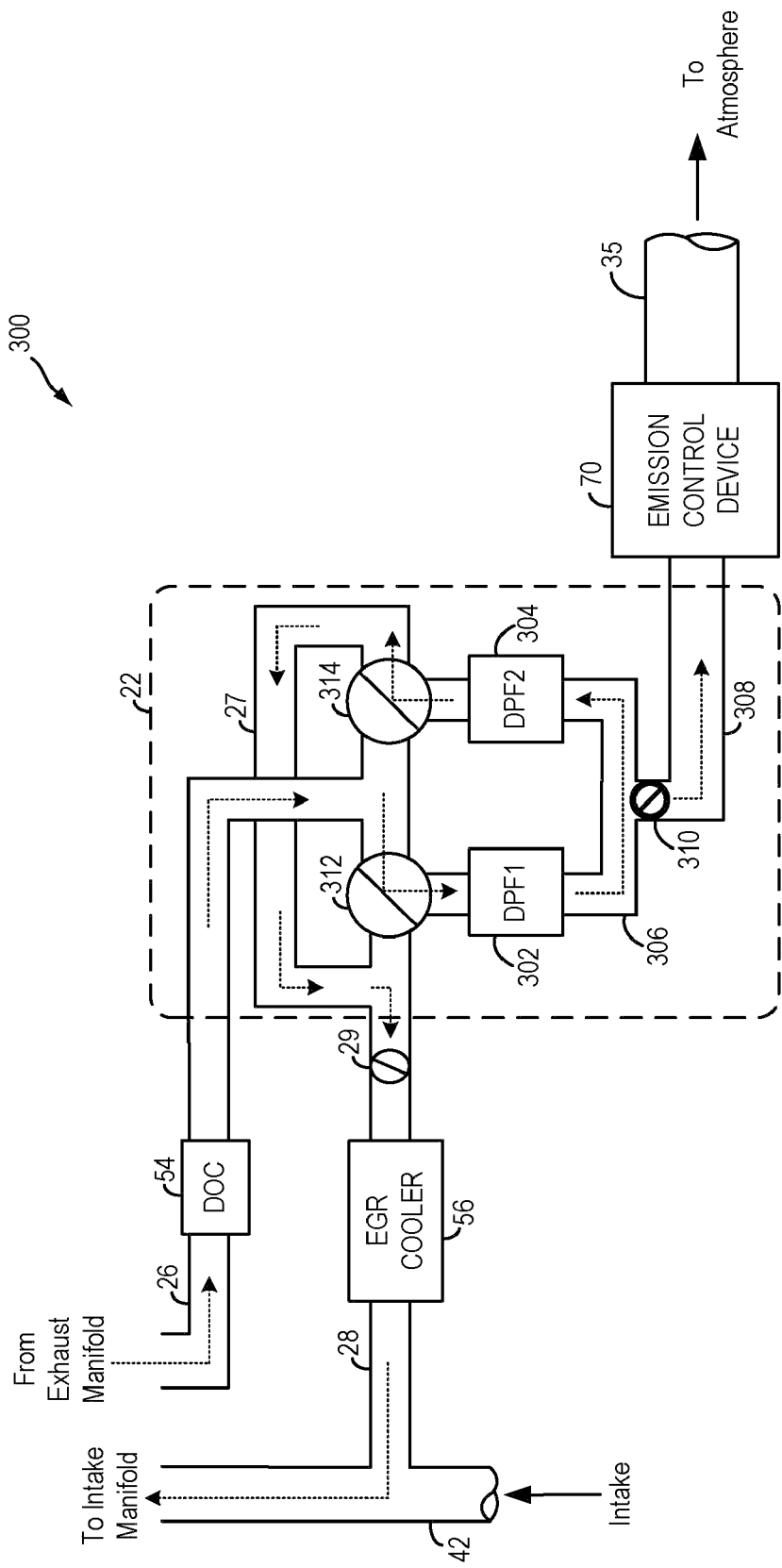
FIG. 3 shows an example embodiment of the particulate matter retaining system of FIG. 1 in a first mode of operation.
Figure 4:
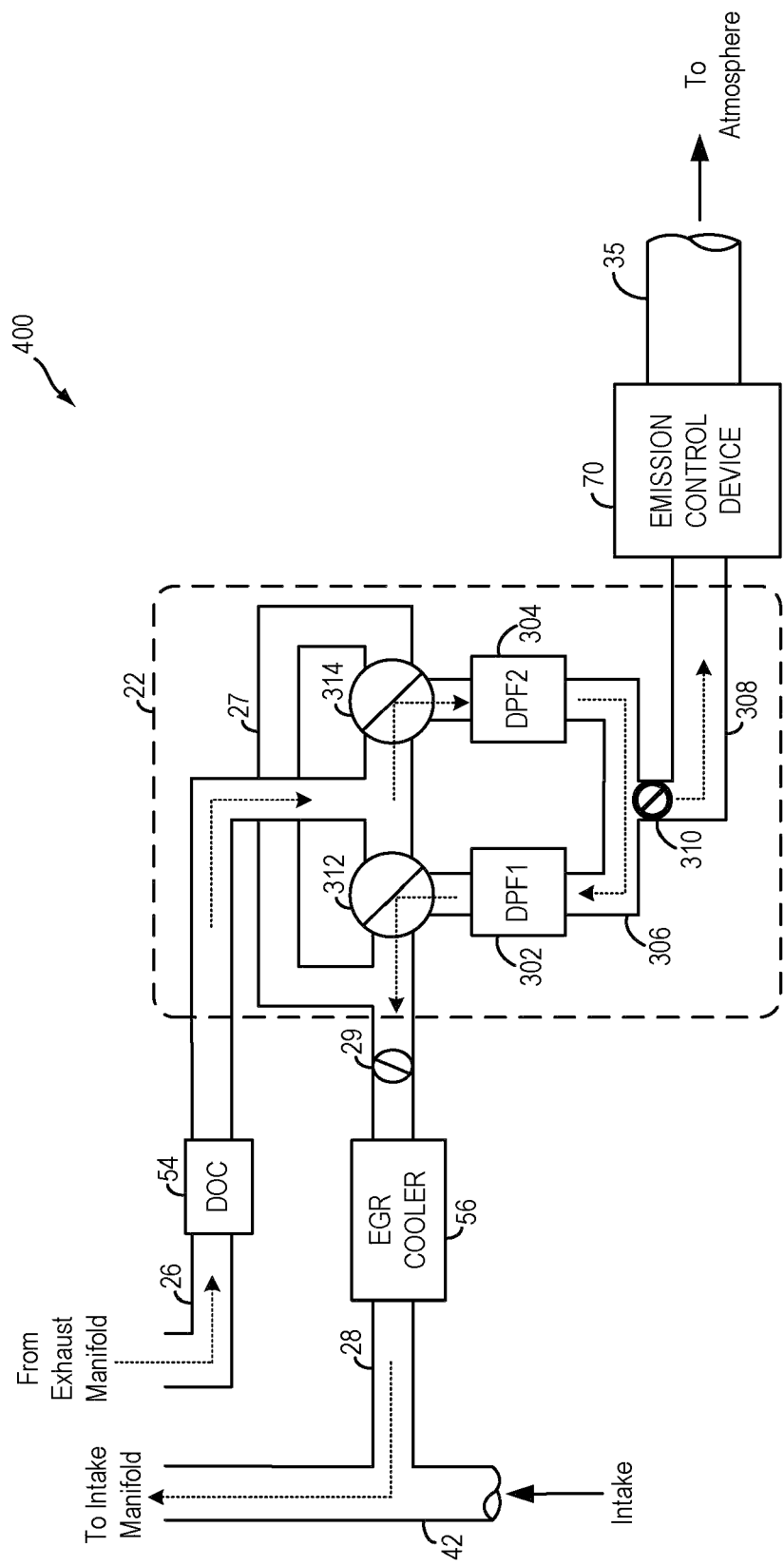
FIG. 4 shows an example embodiment of the particulate matter retaining system of FIG. 1 in a second mode of operation.
Figure 5:
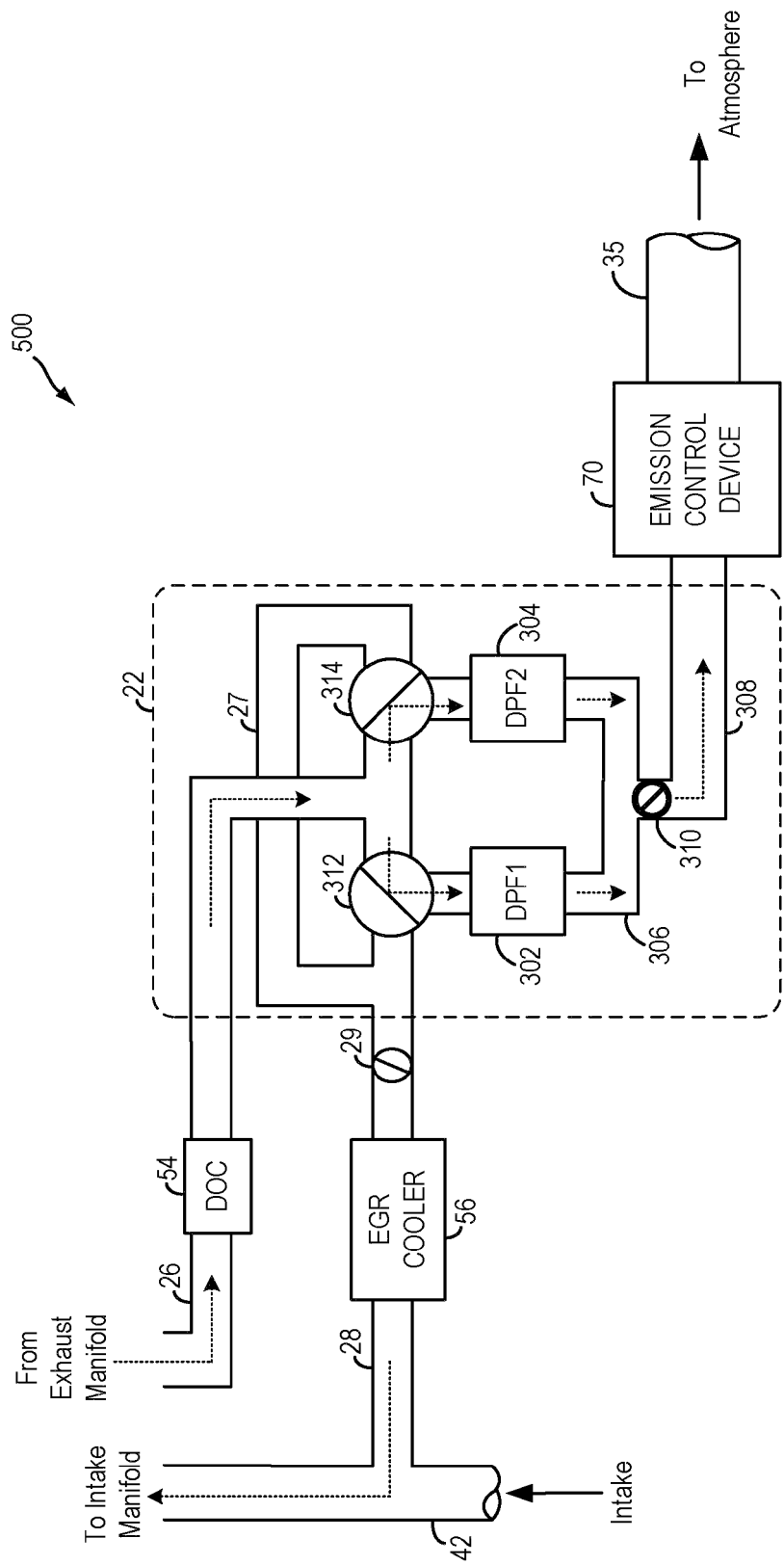
FIG. 5 shows an example embodiment of the particulate matter retaining system of FIG. 1 in a third mode of operation.
Figure 7:
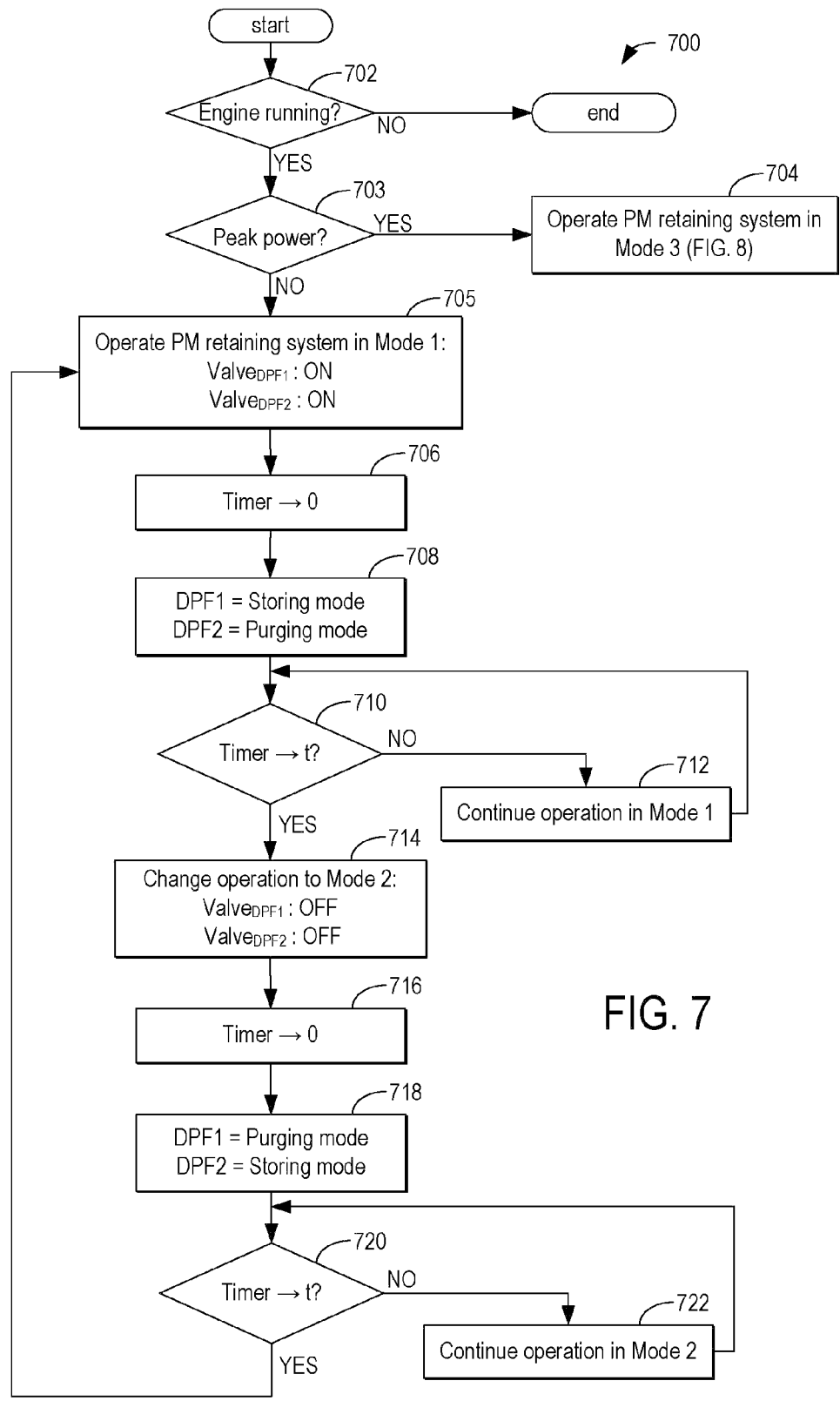
FIGS. 7-8 show high level flow charts illustrating routines that may be implemented for storing and releasing particulates in the particulate matter retaining system of FIG. 1, according to the present disclosure.
Figure 8:
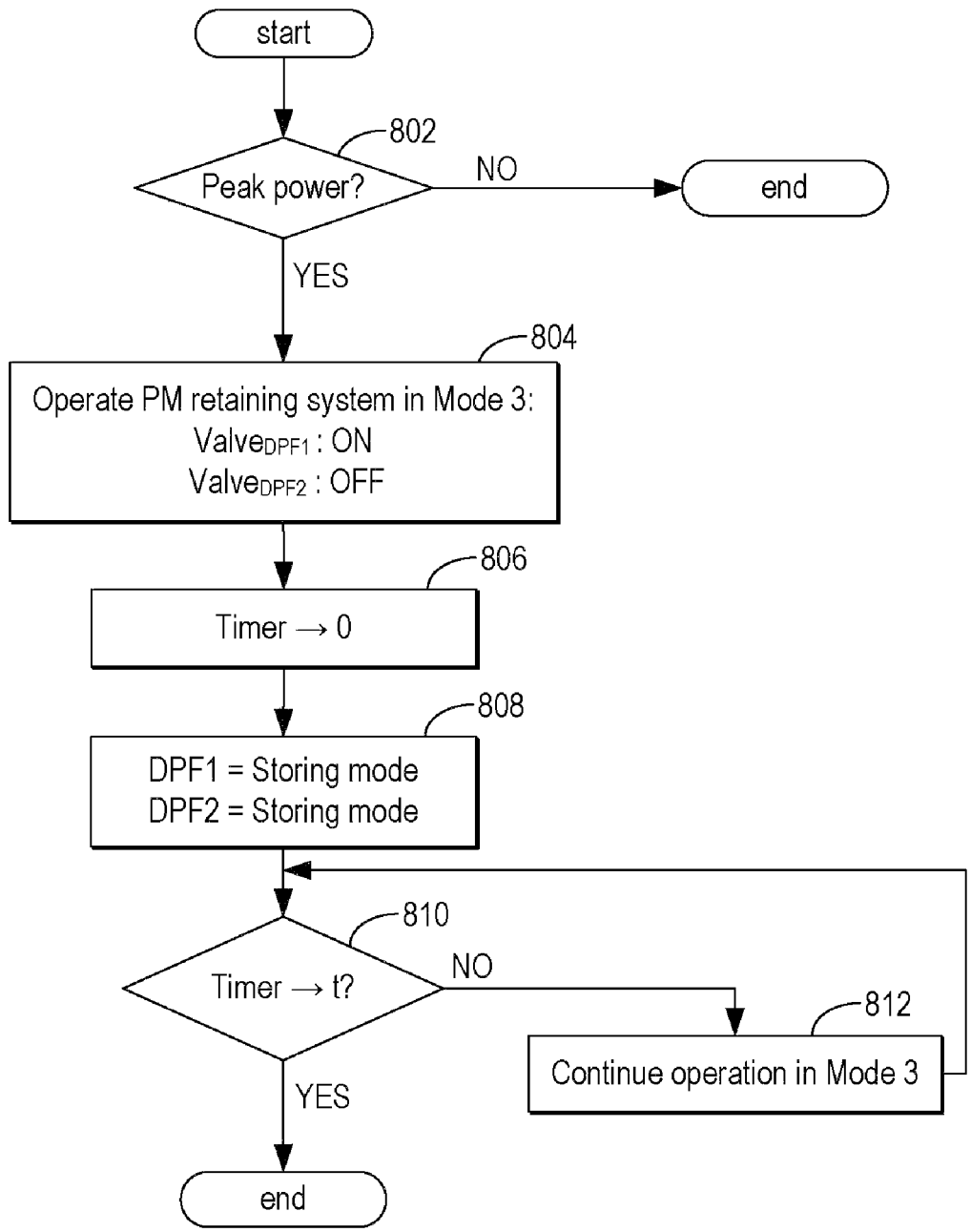

The following description relates to systems and methods for operating a particulate matter retaining system, such as the diesel particulate matter retaining system of FIG. 1. As illustrated in FIGS. 3-4, the control valves of a plurality of particulate filters (two in the depicted example) may be adjusted to enable exhaust gas to flow through the filters in a first direction during a first operating mode, and in a second, opposite, direction during a second operating mode. In each mode, one filter may be storing particulates while the other filter may be releasing particulates collected during a preceding operation. By intermittently alternating operating modes, as shown in FIG. 7, the particulate matter storing and releasing functions of a diesel particulate filter may be regularly alternated. Alternatively, as illustrated in FIGS. 5 and 8, under peak engine operating loads, the control valves of the filters may be adjusted to enable both filters to store particulates. By releasing a portion of the collected particulates to the engine via an EGR passage, the need for active filter regeneration may be reduced. By using the exhaust gas flow to direct stored particulates into an engine intake (directly in one example), potential issues related to insufficient blow-by gas, such as incomplete filter purging, may be reduced. Furthermore, by reducing the need for regeneration-related elevated exhaust temperatures, the fuel efficiency and emission levels of the engine may be improved.

FIG. 1 shows a schematic depiction of a vehicle system 6. The vehicle system 6 includes an engine system 8 coupled to a particulate matter (PM) retaining system 22. The engine system 8 may include an engine 10 having a plurality of cylinders 30. Engine 10 includes an engine intake 23 and an engine exhaust 25. Engine intake 23 includes a throttle 62 fluidly coupled to the engine intake manifold 44 via an intake passage 42. The engine exhaust 25 includes an exhaust manifold 48 eventually leading to an exhaust passage 35 that routes exhaust gas to the atmosphere. Throttle 62 may be located in intake passage 42 downstream of a boosting device, such as turbocharger 50, or a supercharger, and upstream of after-cooler 52. As such, after-cooler 52 may be configured to reduce the temperature of the intake air compressed by the boosting device. Turbocharger 50 may include a compressor 51a, arranged between intake passage 42 and intake manifold 44. Compressor 51a may be at least partially powered by exhaust turbine 51b, arranged between exhaust manifold 48 and exhaust passage 35.

Engine exhaust 25 may include one or more emission control devices 70, which may be mounted in a close-coupled position in the exhaust. One or more emission control devices may include a three-way catalyst, lean NOx filter, SCR catalyst, etc. The engine exhaust 25 may also be operatively coupled to PM retaining system 22 via conduit 26 and diesel oxidation catalyst (DOC) 54. PM retaining system 22 may also be operatively coupled to engine intake 23 via EGR passage 28 and EGR cooler 56. It will be appreciated that other components may be included in the engine such as a variety of valves and sensors, as further elaborated in the example engine of FIG. 2. In one example, as depicted, PM retaining system 22 is a diesel particulate matter retaining system.

PM retaining system 22 may include one or more PM retaining devices, such as one or more diesel particulate filters (DPFs), to temporarily filter PMs from entering gases. Flow of gases through the DPFs may be controlled by respective valves, such as two-way control valves. As further elaborated with reference to FIGS. 3-4, PM retaining system 22 may include a regulated vent for routing at least some tailpipe gases on to emission control device 70 and further on to the atmosphere along exhaust passage 35. Similarly, one or more EGR valves (FIGS. 3-6) may regulate the amount of particulates released by PM retaining system 22 to the engine intake 23.

The vehicle system 6 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 126 (located in exhaust manifold 48), temperature sensor 128, and pressure sensor 129 (located downstream of emission control device 70). Other sensors such as pressure, temperature, air/fuel ratio, and composition sensors may be coupled to various locations in the vehicle system 6, as discussed in more detail herein. As another example, the actuators may include fuel injectors (not shown), two-way control valves (as shown in FIGS. 3-6), an EGR valve (as also shown in FIGS. 3-6) and throttle 62. The control system 14 may include a controller 12. The controller may receive input data from the various sensors, process the input data, and trigger the actuators in response to the processed input data based on instruction or code programmed therein corresponding to one or more routines. An example control routine is described herein with reference to FIGS. 7-8.

PM retaining system 22 may operate to store diesel particulate matters (DPMs), such as soot, from engine exhaust 25 in a first diesel particulate filter (DPF), and concurrently release DPMs stored in a second DPF, to engine intake 23. At least some tailpipe gas may be drawn from the PM retaining system, for example from between the DPFs, for further processing by downstream catalysts and emission control devices and/or for expulsion to the atmosphere. Based on engine operating conditions, such as a temperature of the emission control device, air fuel ratio, etc., the amount of DPMs released to the engine intake (via the engine EGR system) may be adjusted.

Figure 2:
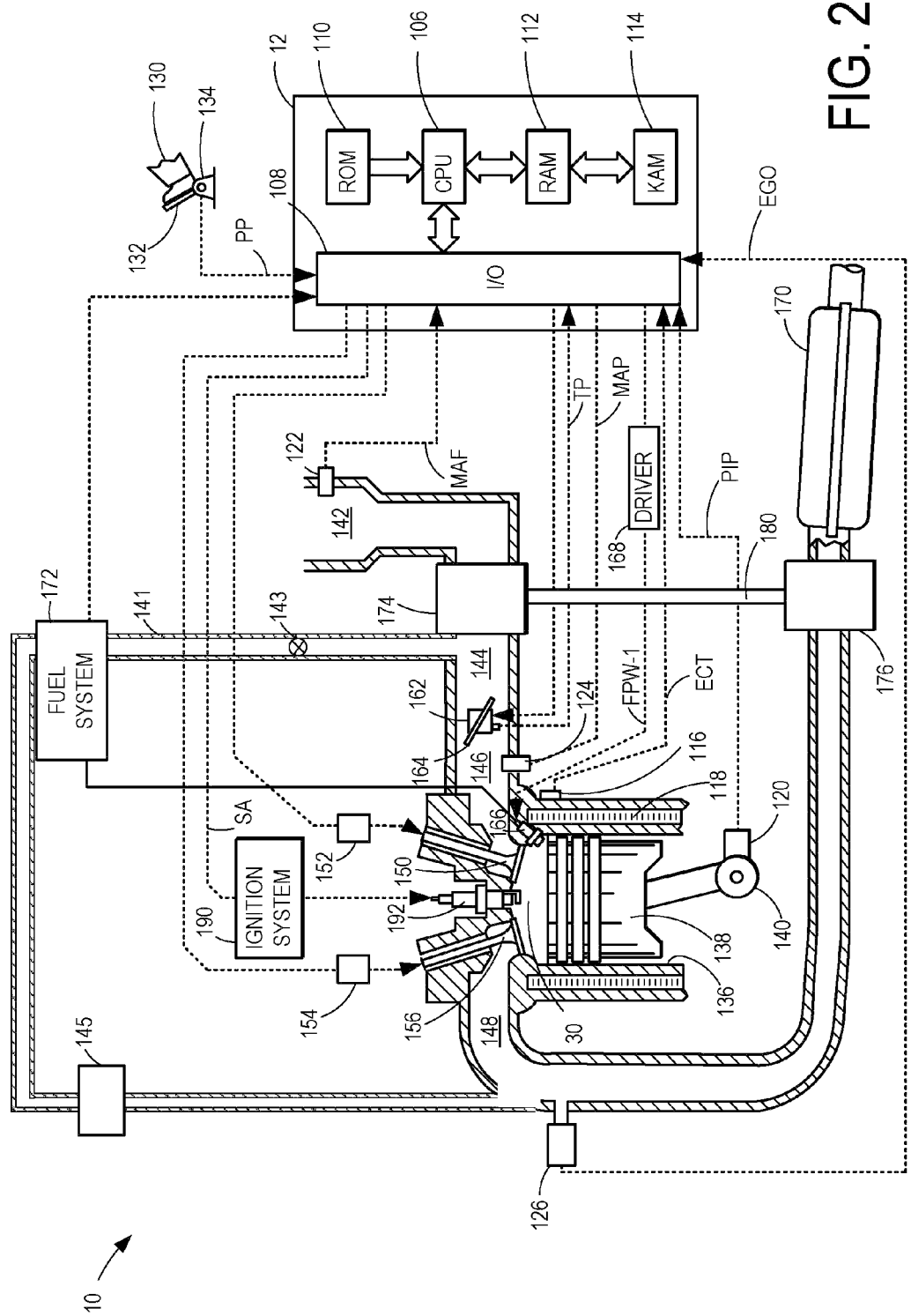
FIG. 2 shows a schematic depiction of an internal combustion engine.

FIG. 2 depicts an example embodiment of a combustion chamber or cylinder of internal combustion engine 10. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Cylinder (herein also "combustion chamber") 30 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 30 can receive intake air via a series of intake air passages 142, 144, and 146. Intake air passage 146 can communicate with other cylinders of engine 10 in addition to cylinder 30. In some embodiments, one or more of the intake passages may include a boosting device such as a turbocharger or a supercharger. For example, FIG. 2 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 162 including a throttle plate 164 may be provided along an intake passage of the engine for varying the flow rate and/or pressure of intake air provided to the engine cylinders. For example, throttle 162 may be disposed downstream of compressor 174 as shown in FIG. 2, or alternatively may be provided upstream of compressor 174.

Exhaust passage 148 can receive exhaust gases from other cylinders of engine 10 in addition to cylinder 30. Exhaust gas sensor 126 is shown coupled to exhaust passage 148 upstream of emission control device 170. Sensor 126 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 170 may be a three way catalyst (TWC), NOx filter, various other emission control devices, or combinations thereof.

Exhaust temperature may be estimated by one or more temperature sensors (not shown) located in exhaust passage 148. Alternatively, exhaust temperature may be inferred based on engine operating conditions such as speed, load, air-fuel ratio (AFR), spark retard, etc. Further, exhaust temperature may be computed by one or more exhaust gas sensors 126. It may be appreciated that the exhaust gas temperature may alternatively be estimated by any combination of temperature estimation methods listed herein.

Each cylinder of engine 10 may include one or more intake valves and one or more exhaust valves. For example, cylinder 30 is shown including at least one intake poppet valve 150 and at least one exhaust poppet valve 156 located at an upper region of cylinder 30. In some embodiments, each cylinder of engine 10, including cylinder 30, may include at least two intake poppet valves and at least two exhaust poppet valves located at an upper region of the cylinder.

Intake valve 150 may be controlled by controller 12 via actuator 152. Similarly, exhaust valve 156 may be controlled by controller 12 via actuator 154. During some conditions, controller 12 may vary the signals provided to actuators 152 and 154 to control the opening and closing of the respective intake and exhaust valves. The position of intake valve 150 and exhaust valve 156 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by controller 12 to vary valve operation. For example, cylinder 30 may alternatively include an intake valve controlled via electric valve actuation and an exhaust valve controlled via cam actuation including CPS and/or VCT. In other embodiments, the intake and exhaust valves may be controlled by a common valve actuator or actuation system, or a variable valve timing actuator or actuation system.

Cylinder 30 can have a compression ratio, which is the ratio of volumes when piston 138 is at bottom center to top center. Conventionally, the compression ratio is in the range of 9:1 to 10:1. However, in some examples where different fuels are used, the compression ratio may be increased.

In some embodiments, each cylinder of engine 10 may include a spark plug 192 for initiating combustion. Ignition system 190 can provide an ignition spark to combustion chamber 30 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 30 is shown including one fuel injector 166. Fuel injector 166 is shown coupled directly to cylinder 30 for injecting fuel directly therein in proportion to the pulse width of signal FPW-1 received from controller 12 via electronic driver 168. In this manner, fuel injector 166 provides what is known as direct injection (hereafter also referred to as "DI") of fuel into combustion chamber 30. While FIG. 2 shows injector 166 as a side injector, it may also be located overhead of the piston, such as near the position of spark plug 192. Alternatively, the injector may be located overhead and near the intake valve to improve mixing. Fuel may be delivered to fuel injector 166 from a high pressure fuel system 172 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12.

It will be appreciated that in an alternate embodiment, injector 166 may be a port injector providing fuel into the intake port upstream of cylinder 30. It will also be appreciated that cylinder 30 may receive fuel from a plurality of injectors, such as a plurality of port injectors, a plurality of direct injectors, or a combination thereof.

Controller 12 is shown in FIG. 2 as a microcomputer, including microprocessor unit 106, input/output ports 108, an electronic storage medium for executable programs and calibration values shown as read only memory chip 110 in this particular example, random access memory 112, keep alive memory 114, and a data bus. Storage medium read-only memory 110 can be programmed with computer readable data representing instructions executable by processor 102 for performing the methods described below as well as other variants that are anticipated but not specifically listed. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and absolute manifold pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold.

An exhaust gas recirculation (EGR) system may route a desired portion of exhaust gas from exhaust passage 148 to intake passage 144 via EGR passage 141. The amount of EGR provided to intake passage 148 may be varied by controller 12 via EGR valve 143. Further, an EGR sensor 145 may be arranged within the EGR passage and may provide an indication of one or more pressure, temperature, and concentration of the exhaust gas.

As described above, FIG. 2 shows only one cylinder of a multi-cylinder engine 10, however each cylinder may similarly include its own set of intake/exhaust valves, fuel injector, spark plug, etc.

Figure 6:
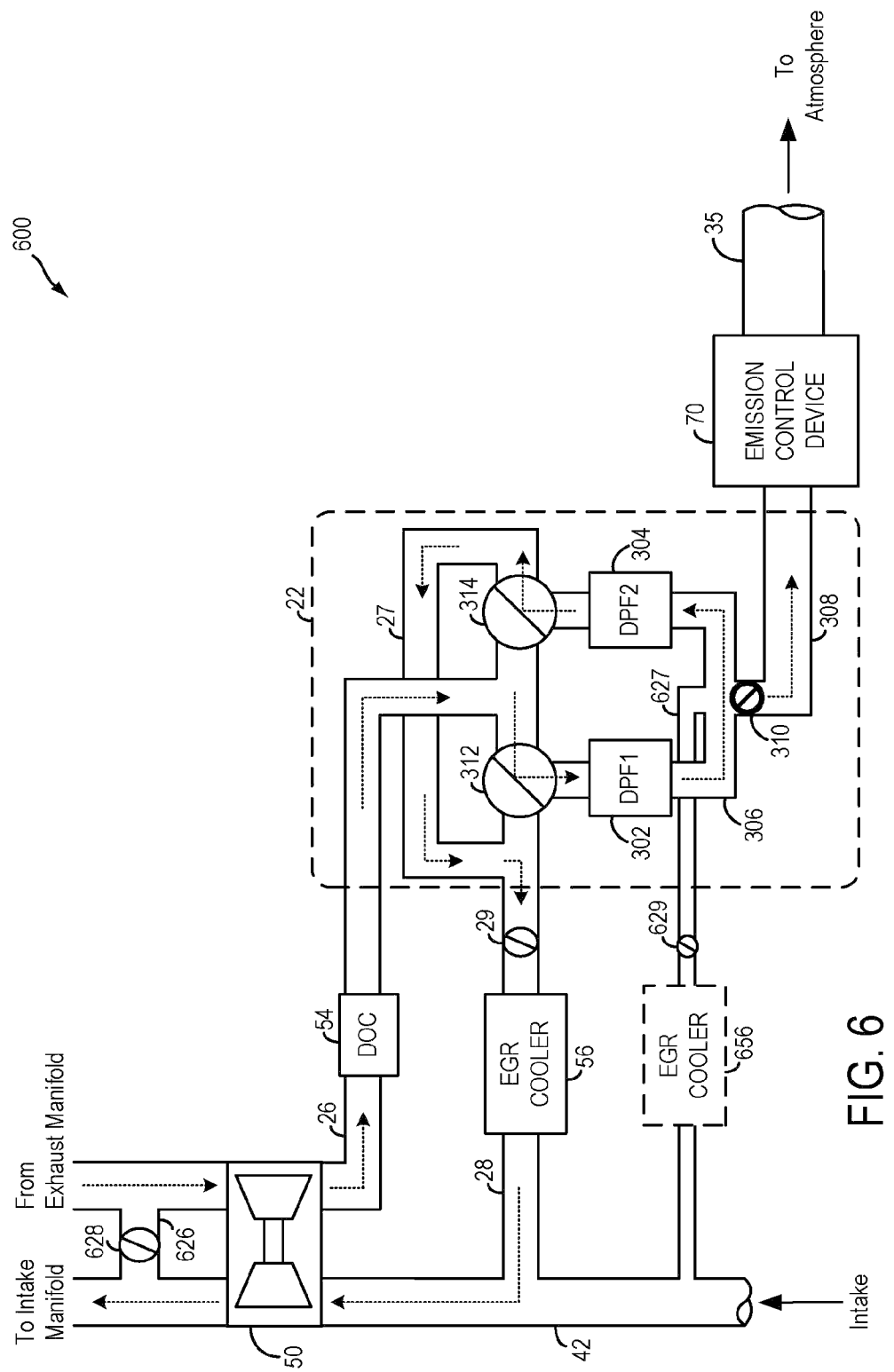
FIG. 6 shows an alternate embodiment of the particulate matter retaining system of FIG. 1.

FIG. 3 shows an example embodiment 300 of particulate matter (PM) retaining system 22 in a first mode (Mode 1) of operation. Similarly, FIG. 4 shows an example embodiment 400 of particulate matter (PM) retaining system 22 in a second mode (Mode 2) of operation while FIG. 5 shows an example embodiment 500 of particulate matter (PM) retaining system 22 in a third mode (Mode 3) of operation. FIG. 6 shows an alternate embodiment of the PM retaining systems of FIGS. 3-6 including high pressure and low pressure EGR loops. It will be appreciated that like numbered components introduced in FIG. 1 may be referenced similarly in FIGS. 3-6.

Returning to FIG. 3, PM retaining system 22 may include PM retaining devices, such as a first diesel particulate filter 302 (DPF1) and a second diesel particulate filter 304 (DPF2), arranged upstream of the emission control device 70. The filters may have monolith structures made of, for example, cordierite or silicon carbide, with a plurality of channels inside for filtering particulate matter from diesel exhaust gas. Furthermore, alternate channels may be plugged. The plugs force the exhaust gas to flow through the channel walls and allow the particulate matter to collect on the outlet face. Thus, at the end of a storing operation, the outlet face of alternate channel plugs may be covered with particulate matter, giving rise to characteristic checkered patterns.

Cleaned exhaust gas from exhaust manifold 48 may flow into PM retaining system 22 after passage through DOC 54, or an air cleaner box, via exhaust conduit 26. Flow of exhaust through the first filter 302 may be regulated by a first two-way control valve 312 coupled to the first filter. Similarly, flow of exhaust through the second filter 304 may be regulated by a second two-way control valve 314 coupled to the second filter. In one example, such as during the first and second modes of operation, the two control valves (312 and 314) may be configured in the same orientation. Thus, for example, when operating in the first mode, control valves 312 and 314 may both be configured in a first configuration, such as the "ON" position. Similarly, as elaborated below with reference to FIG. 4, when operating in the second mode, control valves 312 and 314 may both be configured in a second configuration, such as the "OFF" position. In another example, such as during the third mode of operation depicted in FIG. 5, the two control valves (312 and 314) may be configured in opposite orientations. When configured in the "ON" position, control valve 312 may allow exhaust gas to enter filter 302 while control valve 314 may prevent exhaust gas from entering filter 304. Thus, when both control valves are in the "ON" configuration, exhaust gas may flow in a first direction through the PM retaining system, specifically, through the first filter 302, along conduit 306, followed by the second filter 304. Furthermore, in this configuration, first filter DPF1 may be storing particulate matter (on the outlet face of alternate channels) while second filter DPF2 may be releasing stored particulate matter (that is, the particulate matter stored on the outlet face of alternate channels during a previous storing operation). By using cleaned exhaust gas, particulate matter accumulation inside the outlet channels of the particulate releasing filter (that is, second filter DPF2 when operating in mode 1), may be reduced.

At least some tailpipe gas flowing through PM retaining system 22 may be drawn from conduit 306 through conduit 308, located between first filter 302 and second filter 304. The tailpipe gas drawn through conduit 308 may be further processed in emission control device 70 and/or expelled to the atmosphere via exhaust passage 35. The amount of tailpipe gas drawn from between the filters along conduit 308 may be regulated by regulatory valve 310. In one example, regulatory valve 310 may be a pressure regulator. The pressure regulator may be configured to provide higher static pressure to account for the boost pressure in the intake manifold. It thus follows that, during the first mode, there is higher exhaust gas flow through the first filter than through the second filter.

Further, during the first mode, gas exiting second filter DPF2 is routed to the engine intake. Specifically, following passage through first filter DPF1 and second filter DPF2, exhaust gas containing particulate matter released from the second filter may flow into EGR line 28 via connecting conduit 27. Before entry into intake passage 42 and subsequently intake manifold 44, the exhaust gas may be cooled in EGR cooler 56. In addition to regulating the amount of gas released to downstream components and/or the atmosphere, regulatory valve 310 may also regulate the amount of exhaust gas released into the EGR line, that is, the EGR rate. Additionally, or optionally, an EGR valve 29 positioned in EGR line 28, upstream of EGR cooler 56, may regulate the EGR rate. In this way, during the first mode, by decreasing an amount of flow through the second filter, an amount of exhaust gas recirculation may be decreased. Regulatory valve 310 and/or EGR valve 29 may adjust an amount of tailpipe gas drawn and an amount of exhaust gas recirculated based on engine operating conditions, such as, a desired EGR rate, an air-fuel ratio, exhaust temperature, filter temperature, etc.

Now turning to FIG. 4, during the second mode of operation (mode 2), two-way control valves 312 and 314 may both be configured in the "OFF" position. When configured in the "OFF" position, control valve 314 may allow exhaust gas to enter second filter 304 while control valve 312 may prevent exhaust gas from entering first filter 302. Thus, when both control valves are in the "OFF" configuration, exhaust gas may flow in a second direction through the PM retaining system, specifically, through the second filter 304 (DPF2), along conduit 306 (in a direction opposite to when operating in the first mode) followed by the first filter 302 (DPF1). Furthermore, in this configuration, DPF2 may be storing particulate matter (on the outlet face of alternate channels) while DPF1 may be releasing stored particulate matter (that is, the particulate matter collected on the outlet face of alternate channels during the preceding, first, mode of operation).

Herein, as in the first mode, at least some tailpipe gas flowing through PM retaining system 22 may be drawn from conduit 306 through conduit 308 for further processing in emission control device 70 and/or expulsion to the atmosphere via exhaust passage 35. Regulatory valve 310 may regulate the amount of tailpipe gas drawn along conduit 308. It thus follows that, during the second mode, there is lower exhaust gas flow through the first filter than through the second filter.

Further, during the second mode, gas exiting first filter DPF1 is routed to the engine intake. Specifically, following passage through second filter DPF2 and first filter DPF1, exhaust gas containing particulate matter released from first filter DPF1, may directly flow into EGR line 28. Unlike in mode 1, herein, passage through connecting conduit 27 may not be necessitated. Before entry into intake passage 42 and subsequently intake manifold 44, the exhaust gas may be cooled in EGR cooler 56. Regulatory valve 310 may regulate the amount of exhaust gas released into the EGR line, that is, the EGR rate. Additionally, or optionally, EGR valve 29 positioned in EGR line 28, upstream of EGR cooler 56, may regulate the EGR rate. The EGR rate may be adjusted in response to engine operating conditions including an engine speed/load condition. In this way, during the second mode, an amount of flow through the first filter may be decreased to decrease an amount of exhaust gas recirculation. Regulatory valve 310 and/or EGR valve 29 may adjust an amount of tailpipe gas drawn and an amount of exhaust gas recirculated based on engine operating conditions, such as, a desired EGR rate, an air-fuel ratio, exhaust temperature, filter temperature, etc. The amount of tailpipe gas drawn and/or the amount of exhaust gas carrying released particulate matter that is delivered to the intake manifold may also be adjusted in response to an amount of particulate matter stored in at least one of the first and second filters. For example, the amount of particulate matter delivered to the intake manifold and the EGR rate may be increased as the amount of particulate matter stored in the filters increases. Similarly, the amount of particulate matter delivered to the intake manifold and the EGR rate may be decreased as the amount of particulate matter stored in the filters decreases.

As further elaborated below with reference to FIG. 7, a controller may adjust operation of the control valves such that each mode of operation (that is, mode 1 and mode 2) may last for a fixed, predetermined amount of time. The time interval may be based on different engine operating conditions, such as a DPF soot load (for example, based on the DPF backpressure), engine soot model, the output from an integrating soot sensor (for example, a sensor that accurately measures the actual PM load in the filters), filter temperature, etc. In one example, each mode may last for 1 hour, although, it will be appreciated that other time intervals may also be possible. By operating in each mode for 1 hour, in effect, the storing filter (that is, DPF1 during the first mode and DPF2 during the second mode) may be loading particulates for about half an hour. During this time, approximately half-maximal soot (or particulate matter) loading may be expected in the storing filter. In this way, filter clogging and related pressure drop issues may be reduced. Similarly, the releasing filter (that is, DPF2 during the first mode and DPF1 during the second mode) may be releasing stored particulates into the EGR line for about half an hour. In this way, collected particulate matter may be efficiently released to engine cylinders for subsequent combustion, thereby unclogging the channels before a succeeding storing operation, and averting the need for filter regeneration.

In other embodiments, operation between the modes may be alternated responsive to a DPF backpressure (for example, a threshold pressure), an engine soot model, the output of an integrating soot sensor capable of accurately measuring the actual PM load in the filters (for example, a threshold PM load), etc.

Thus, by running an engine particulate matter retaining system continuously and sequentially between the two modes of operation, wherein particulate matter storing and releasing operations of the constituent particulate filters are regularly alternated, particulate matter storing and releasing efficiencies can be improved without necessitating filter regeneration. Furthermore, by releasing the stored particulate matter directly into the engine cylinders, for further combustion, fuel efficiency can be improved.

Now turning to FIG. 5, during a third mode of operation (mode 3), two-way control valves 312 and 314 may be adjusted to be in opposite orientations. As depicted, control valve 312 may be in an "ON" configuration while control valve 314 is in an "OFF" configuration, although the reverse combination may also possible. In this configuration, control valve 312 may allow exhaust gas to enter first filter 302 while control valve 314 may allow exhaust gas to enter second filter 304. Thus, exhaust gas may flow through both filters of the PM retaining system and enter conduit 306, from where the exhaust may enter conduit 308 and be vented to the atmosphere along exhaust passage 35. Furthermore, in this configuration, both filters may be storing particulate matter. As such, the PM retaining system may be operated in the third operating mode during certain engine operating conditions, such as during peak power demand and/or high engine load. Since the peak power capability of engine is substantially affected by exhaust back-pressures, which in turn is affected by catalysts size, by using both filters in a storing mode during peak engine loads, the effective size of the filter may be increased, the exhaust back-pressure may be decreased, and the engine's peak power output may be significantly improved.

FIG. 6 depicts an alternate embodiment 600 of the PM retaining system of FIGS. 3-5. Specifically, embodiment 600 additionally includes a high pressure and a low pressure EGR loop. A high pressure EGR loop 626 may be positioned upstream of turbocharger 50, between the intake and exhaust manifolds. The high pressure EGR loop may also be omitted in some examples. Flow of exhaust from the exhaust manifold along high pressure EGR loop 626 may be regulated by EGR valve 628.

A low pressure EGR loop 627 may additionally be provided to enable the PM retaining system to draw low pressure EGR. Low pressure EGR loop 627 may be positioned to draw exhaust downstream of the (storing) diesel particulate filter, specifically from conduit 306. The exhaust gas to be re-circulated into the engine intake may be passed through an optional EGR cooler 656. Furthermore, EGR valve 629 may regulate the amount of exhaust gas released (and/or the rate of release) into the low pressure EGR loop 627. While the depicted embodiment shows the use of optional EGR cooler 656, in still other embodiments, low pressure EGR loop 627 may not include an EGR cooler, and may instead, merge with EGR line 28 upstream of EGR valve 29, thereby enabling EGR loop 627 to also utilize EGR valve 29 and EGR cooler 56.

Now turning to FIG. 7, an example routine 700 for storing and releasing particulates in the particulate matter retaining system of FIG. 1 during a first and second mode of operation is described. At 702, it may be confirmed that the engine is running, else the routine may end. As such, in one example, the storing-releasing operation may only be performed when the engine is running. At 703, it may be determined whether the engine is running at peak power. Peak power may be estimated, for example, based on the prevalent engine speed, engine load and/or engine torque output. As such, at peak power, even small amounts of exhaust back-pressure may have a large adverse impact on engine performance. Accordingly, if the engine is operating at peak power, at 704, the PM retaining system may be operated in mode 3 (as further elaborated in FIG. 8) to enable a full flow of exhaust through the DPFs of the PM retaining system.

If the engine is not operating at peak power, then at 705, the PM retaining system may be configured to operate in mode 1 wherein the control valves for the first and second filters (DPF1 and DPF2) may be switched to an "ON" configuration. In the depicted example, mode 1 may be the default mode of operation, used, for example, at engine cold start. At 706, a PM retaining system timer may be set to zero and started. At 708, in response to the configuration of the control valves, cleaned exhaust gas may flow in a first direction through the filters, such that first filter DPF1 is storing particulates and second filter DPF2 is concurrently releasing stored particulates. That is, DPF1 may be collecting particulates in alternate channels of the filter while DPF2 may be releasing particulates, collected during a preceding operation, into the engine via the EGR line. At 710, it may be confirmed whether a predetermined time interval (t) has passed. In one example, the predetermined time interval is 1 hour. Thus, it is verified whether operation in mode 1 has occurred for 1 hour. If not, then at 712, operation in mode 1 may continue until the predefined time interval has passed.

If elapse of the predetermined time interval is confirmed, at 714, the PM retaining system may be configured to operate in mode 2 wherein the control valves for the first and second filters may be switched to an "OFF" configuration. At 716, the timer may be reset to zero and then restarted. At 718, in response to the configuration of the control valves, cleaned exhaust gas may flow in a second direction through the filters, such that first filter DPF1 is releasing particulates and second filter DPF2 is storing particulates. That is, DPF2 may be collecting particulates in alternate channels of the filter while DPF1 may be releasing particulates, collected during the preceding operation in mode 1, into the engine via the EGR line. At 720, it may be confirmed whether the predetermined time interval (t) has passed. In the depicted example, the predetermined time interval for operation in either mode is 1 hour. However, it will be appreciated that in alternate embodiments, the time interval for operation in each mode may be different. Furthermore, the predetermined time interval for each operating mode may be independently adjusted responsive to engine operating conditions, such as exhaust temperature, EGR rate desired, air fuel ratio, a DPF soot load (for example, based on the DPF backpressure), engine soot model, the output from an integrating soot sensor (for example, a sensor that accurately measures the actual PM load in the filters), filter temperature, etc. If it is confirmed that operation in mode 2 has completed the desired time interval, then the routine may return to 704 to alternate mode of operation to mode 1. If the desired time interval has not elapsed, then at 722, operation in mode 2 may continue until the predefined time interval has passed. In this way, the filters may be sequentially operated in the first mode until a first threshold is reached, and then operated in the second mode until a second threshold is reached.

While the depicted example illustrates operating the PM retaining system sequentially between the first and second operating modes based on a time interval (that is, a time based threshold) set by a PM retaining system timer, in other embodiments, operation between the modes may be alternated responsive to a DPF backpressure (for example, a threshold pressure), an engine soot model, the output of an integrating soot sensor capable of accurately measuring the actual PM load in the filters (for example, a threshold PM load), etc. That is, the first and second thresholds for the first and second filters may be independently adjusted responsive to operating conditions.

Now turning to FIG. 8, an example routine 800 for storing particulates in the PM retaining system of FIG. 1 during a third mode of operation is described. As such, the PM retaining system may be operated in mode 3 under select engine operating conditions, such as during engine operation at high loads and peak power. Accordingly, at 802, it may be confirmed that engine is running at peak power. If not, the routine may end. Upon confirmation of engine peak power output, the PM retaining system may be configured to operate in mode 3 wherein the control valve for the first filter (DPF1) may be switched to an "ON" configuration while the control valve for the second filter (DPF2) may be switched to an "OFF" configuration. That is, in contrast to modes 1 and 2 where both control valves may be in a similar configuration (both "ON" or both "OFF"), in mode 3, the control valves may be adjusted to be in different configurations.

At 806, a PM retaining system timer may be set to zero and started. At 808, in response to the configuration of the control valves, cleaned exhaust gas may flow through both the filters such that both filters are storing particulates. Herein, by enabling both filters to store particulates during peak engine operation, the peak power exhaust flow may be efficiently distributed between the filters and excess soot build-up in any one filter may be reduced, thereby reducing the chances of exhaust back-pressure build-up. By reducing the exhaust back-pressure, the engine performance may be maintained at a high level during engine high output demand. At 810, it may be confirmed whether a predetermined time interval (t) has passed. Alternatively, it may be confirmed whether a threshold DPF backpressure or a threshold PM load has been attained. If so, the routine may end. Else, the routine may continue operation in mode 3 until the threshold is reached. As such, by alternating storing and releasing functions of the filters at low to medium engine loads, and then switching to a storing only function at high engine loads, the DPF materials may be sized smaller than if peak power flow were flown though a single DPF only.

In this way, a particulate matter retaining system may be sequentially operated between a first and a second mode, at low-medium engine loads, such that the particulate matter storing and releasing functions of the constituent filters may be regularly alternated. Furthermore, the particulate matter retaining system may be operated in a third mode, at high engine loads, wherein both filters are performing a storing function, such that a peak power flow of exhaust may be distributed between the filters. In doing so, excess soot build up in the filters may be reduced, thereby reducing related issues such as clogging, pressure build-up, and the need for active regeneration. By releasing stored particulates directly into an engine intake, specifically into engine cylinders, for subsequent combustion, filter regeneration using downpipe fuel injections and escalated temperatures may be reduced while enhancing the fuel efficiency and emissions quality of the vehicle.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of operating a particulate matter retaining system coupled to an engine exhaust and an engine intake, the particulate matter retaining system comprising at least a first and a second filter, the method comprising:
during a first condition,
operating in a first mode with the first filter storing particulate matter and the second filter releasing stored particulate matter into the engine intake, with exhaust gas flowing in a first direction through the filters, where flowing in the first direction comprises flowing through the first filter before flowing through the second filter, and where during the first mode, at least some tailpipe gas is drawn from between the first and second filters for expulsion to the atmosphere; and
operating in a second mode with the first filter releasing stored particulate matter into the engine intake and the second filter storing particulate matter, the exhaust gas flowing in a second, opposite, direction through the filters, where flowing in the second direction comprises flowing through the second filter before flowing through the first filter, and where during the second mode, at least some tailpipe gas is drawn from between the first and second filters for expulsion to the atmosphere.

2. The method of claim 1 wherein during the first mode, there is higher exhaust gas flow through the first filter than through the second filter, and during the second mode, there is lower exhaust gas flow through the first filter than through the second filter.

3. The method of claim 1 further comprising, during the first mode, decreasing an amount of flow through the second filter to decrease an amount of exhaust gas recirculation.

4. The method of claim 1 wherein an amount of tailpipe gases drawn from between the filters is dependent on engine operating conditions.

5. The method of claim 1 further comprising, sequentially operating between the first and second operating modes.

6. The method of claim 5 wherein sequentially operating between the first and second operating modes includes operating in the first mode until a first threshold is reached, and then operating in the second mode until a second threshold is reached, the first and second thresholds independently adjusted responsive to at least one of a time interval, a DPF back-pressure, and a DPF soot load.

7. The method of claim 1 wherein the first filter is coupled to a first control valve and the second filter is coupled to a second control valve, and wherein operating in the first mode comprises setting both the first and second control valves to a first configuration, and wherein operating in the second mode comprises setting both the first and second control valves to a second configuration.

8. The method of claim 7 wherein the first configuration is an ON configuration, and the second configuration is an OFF configuration.

9. The method of claim 1 wherein the exhaust gas is cleaned exhaust gas that has been passed through an air cleaner box/DOC.

10. The method of claim 1 further comprising, during a second condition, operating in a third mode with the first filter storing particulate matter and the second filter also storing particulate matter, and where during the third mode, at least some tailpipe gas is drawn from between the first and second filters for expulsion to the atmosphere.

11. The method of claim 10 wherein the first filter is coupled to a first control valve and the second filter is coupled to a second control valve, and wherein operating in the third mode comprises setting the first control valve to a first configuration and the second control valve to a second configuration, and wherein during the third mode, there is substantially equal exhaust gas flow through the first filter and the second filter.

12. The method of claim 11 wherein the second condition includes a higher engine load and/or a peak engine power output.

13. A system for a vehicle including an engine having an intake and an exhaust, the system comprising:
a particulate matter (PM) retaining system coupled to the engine intake and engine exhaust, said PM retaining system including at least a first filter and a second filter, said first filter coupled to a first control valve, said second filter coupled to a second control valve; and
a controller configured to,
during a first condition, operate in a first mode wherein the first filter stores particulate matter and the second filter releases collected particulate matter into the intake, where exhaust gas is drawn from between the first and second filters and then routed to a tailpipe, and where exhaust gas flows in a first direction through the filters, the flow in the first direction comprising flowing through the first filter before flowing through the second filter;
operate in a second mode wherein the first filter releases collected particulate matter into the intake and the second filter stores particulate matter, where exhaust gas is drawn from between the first and second filters and then routed to the tailpipe, and where exhaust gas flows in a second, opposite, direction through the filters, the flow in the second direction comprising flowing through the second filter before flowing through the first filter; and
adjust an amount of exhaust gas recirculation by adjusting an amount of exhaust gas drawn from between the first and second filters.

14. The system of claim 13 wherein the PM retaining system includes a branched conduit coupled to the engine intake and engine exhaust, the branched conduit comprising two branches, wherein the first filter and first control valve are positioned in a first branch of the branched conduit, and wherein the second filter and second control valve are positioned in a second branch of the branched conduit.

15. The system of claim 14 wherein the first control valve is positioned between the engine intake and the first filter and wherein the second control valve is positioned between the engine intake and the second filter.

16. The system of claim 15 wherein routing exhaust gas to the tailpipe includes drawing exhaust gas from the branched conduit, between the first and second filters.

17. The system of claim 15 wherein the controller is further configured to, during a second condition, operate in a third mode wherein both the first and second filters store particulate matter, and where exhaust gas is drawn from between the first and second filters and then routed to the tailpipe.

18. An engine method, comprising:
in a first mode, flowing exhaust gas through and storing particulates in a first particulate filter, then flowing the gas through a second particulate filter and releasing particulates from the second filter to an engine intake; and
in a second mode, flowing exhaust gas through and storing particulates in the second filter, then flowing the gas through the first filter and releasing particulates from the first filter to the intake.

19. The method of claim 18 wherein during the first mode, exhaust gas flows in a first direction through each of the first and second filters, and during the second mode, exhaust gas flows in a second, opposite, direction through each of the first and second filters.

20. The method of claim 19 wherein during at least a portion of each of the first and second modes, at least some exhaust gas is drawn from between the first and second filters and directed toward a tailpipe.

21. The method of claim 20 wherein during the first mode, exhaust gas flows through the first filter before reaching the second filter.

22. The method of claim 20 wherein during the second mode, exhaust gas flows through the second filter before reaching the first filter.

23. The method of claim 18 further comprising, adjusting an amount of exhaust gas carrying released particulates that is delivered to the intake, said amount adjusted in response to an amount of particulates stored in at least one of the first and second filters.

24. The method of claim 18 further comprising adjusting an amount of exhaust gas carrying released particulates that is delivered to the intake, said amount adjusted in response to engine operating conditions.

25. The method of claim 24 further comprising, during engine peak power, operating in a third mode wherein both the first and second filters store particulates.

* * * * *